Nov. 1, 1949     W. H. T. HOLDEN     2,486,784
TELEMETRIC SYSTEM

Original Filed June 30, 1944     2 Sheets-Sheet 1

INVENTOR
W.H.T. HOLDEN
BY P.C. Smith
ATTORNEY

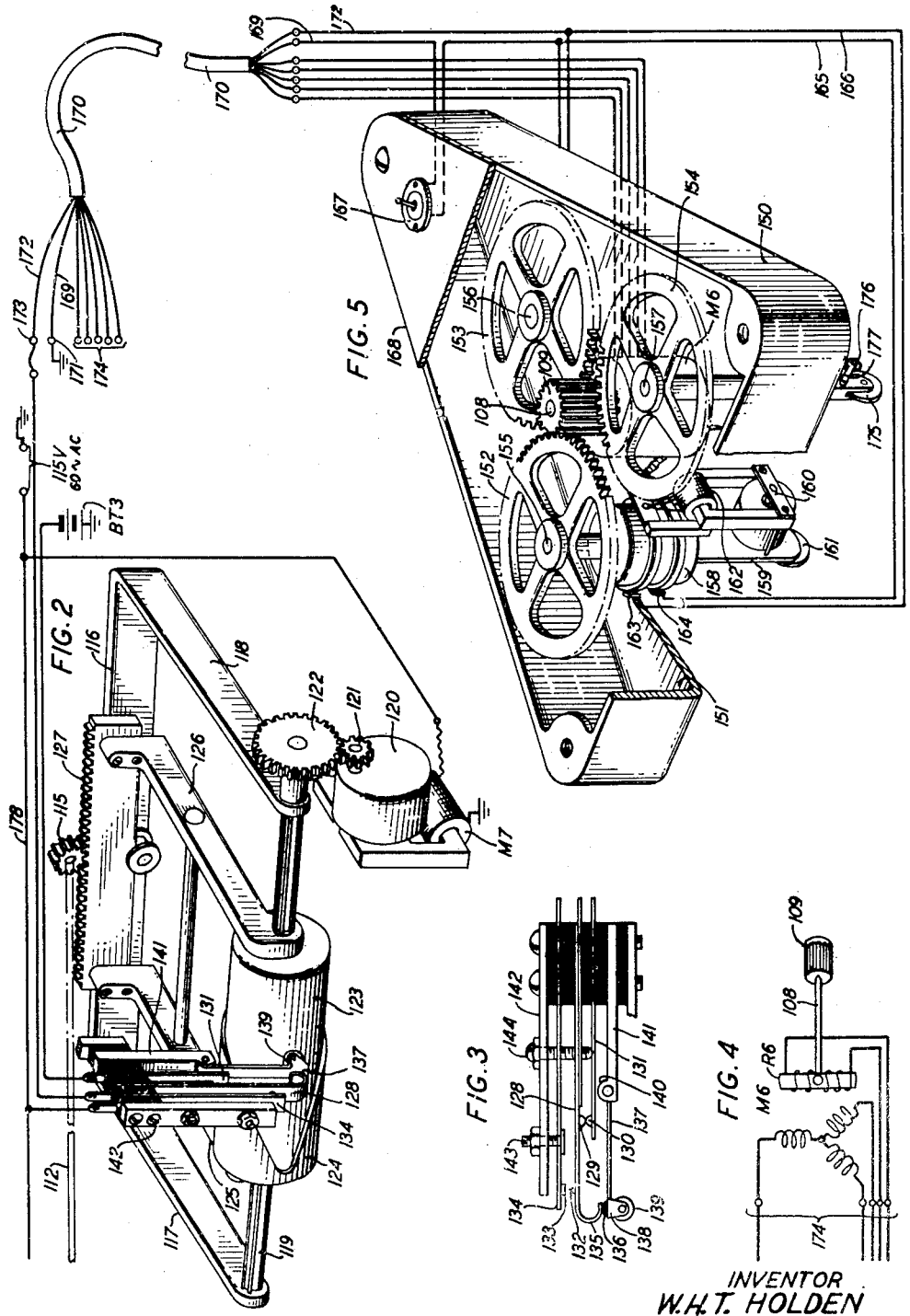

Patented Nov. 1, 1949

2,486,784

UNITED STATES PATENT OFFICE 2,486,784

TELEMETRIC SYSTEM

William H. T. Holden, Woodside, N. Y., assignor to Bell Telephone Laboratories, Incorporated, New York, N. Y., a corporation of New York Continuation of application Serial No. 542,967, June 30, 1944. This application October 11, 1945, Serial No. 621,691

4 Claims. (Cl. 318—18)

This invention relates to a telemetric system and more particularly to a telemetric system for controlling the flight recording apparatus of an aircraft trainer.

In trainers heretofore employed to give training to an aircraft pilot simulating as closely as possible actual flight conditions, an instructor's desk has been provided with controls operable by the instructor to introduce flight conditions which the trainee pilot must meet in his operation of the controls of the trainer. Also the instructor's desk is provided with instruments which are operable from the trainer and from which instruments the instructor is able to check the flight reactions of the trainee to the flight conditions which the instructor has imposed.

Among these instruments is a flight recorder, sometimes called a "crab" because of its ability to move forwardly or sidewise in response to the operation of the controls of the trainer. This flight recorder is provided with one or more tractor wheels by which it may be propelled over a record sheet under the control of one or more driving motors at a speed proportional to the ground speed of the simulated flight being flown by the trainee. These tractor wheels may also be oriented to steer the flight recorder in accordance with the actual bearing of the simulated flight course. The recorder is also provided with a marking wheel which makes a record on the record sheet indicating the simulated flight course. A recorder of this type is disclosed in Patent 2,179,663 granted November 14, 1939, to E. A. Link, Jr.

It is the object of the present invention to provide a telemetric system for controlling a flight recorder which system is simple in construction and accurate and reliable in operation.

This object is attained in accordance with the present invention by the employment of electrically coupled generators and control transformers in combination with servo-motors.

The ground speed of an aircraft in flight is determined by the true air speed as modified by the effect of the wind velocity and the direction of the actual track of the aircraft is determined by the bearing of the aircraft as modified by the wind direction. The true air speed of an aircraft is the air speed indicated by the air speed instrument corrected in accordance with the altitude and the temperature. In a trainer of the type disclosed in the application of R. C. Davis, E. J. Fogarty, and R. O. Rippere, Serial No. 542,986, filed June 30, 1944, the true air speed of the simulated flight is determined by a motor control circuit which in turn is controlled from the motor control circuit which operates the indicated air speed instrument on the pilot's instrument panel and a duplicate instrument on the instructor's desk and which is also controlled in accordance with the altitude at which the simulated flight is being flown. The bearing of the simulated flight, as determined by the steering control of the trainer, is determined by a motor control circuit which controls the setting of the compass on the pilot's instrument panel and of a duplicate compass which is located on the instructor's desk.

Since these two motor control circuits determine the instantaneous values of the true air speed and the compass bearing of the simulated flight, they may be employed to also control the flight recorder. For this purpose a variable autotransformer is associated with the true air speed circuit and a generator having three Y connected stator windings is associated with the compass circuit. Potential from a source of alternating current is applied across the primary winding of the autotransformer and the potential derived from its secondary winding, which is varied by the movement of the brush of the variable autotransformer in accordance with the true air speed is applied across the single rotor winding of the generator. This rotor is rotatable by the compass motor circuit and causes the variation of the potentials induced into the three windings of the generator stator in a measure proportional to the rate of change of the compass bearing and causes a change of the strength of such potentials proportionally to the change in the true air speed.

Since the track of the simulated flight is determined not only by the air speed and flight bearing but also by the wind velocity and wind direction, provision is also made for introducing these factors into the control of the flight recorder. For this purpose a variable autotransformer and a second generator are provided at the instructor's desk. Potential from the same source of alternating current is applied across the primary winding of this autotransformer and the potential derived from its secondary winding, which is varied by the movement of the brush of the variable autotransformer by the instructor in accordance with the assumed velocity of the wind, is applied across the single rotor winding of this generator. This rotor is rotatable by the instructor to a position indicative of the direction of the wind and causes the variation of the potentials induced into the three windings of the generator stator in a measure proportional to the change of wind velocity and causes a change of the strength of such potentials proportionally to the change in the wind direction.

The stator windings of the two generators are linked together by transformer windings, whereby the potentials in the corresponding windings are added and applied to the corresponding windings of two control transformers of the same type. The stator windings of these transformers are connected in parallel and the rotors are mounted upon the same shaft but with their windings disposed in quadrature. The potential induced into the rotor winding of the first of these transformers from the variation of the potentials applied to its stator windings is amplified and applied to the control phase winding of a two-phase servo-motor, the other winding of which is energized from the alternating current source. This servo-motor is geared by reduction gearing to the rotor shaft of the control transformers and when the servo-motor operates it rotates the rotor shaft until the rotor winding of the first transformer assumes an angular position corresponding to the sum of the angular positions of the rotors of the two generators or a position indicative of the direction of the true track of the simulated flight. At this time the rotor winding will be so positioned as to have no potential induced therein whereupon the servo-motor will cease its operation. The operation of the servo-motor is also effective to drive a generator which is coupled with a synchronous repeater on the flight recorder to orient the tractor wheels of the recorder whereby the flight recorder is steered in accordance with the true bearing of the simulated flight course.

At the time the rotor winding of the first control transformer was turned to the position in which it received no induced potential, the rotor winding of the second control transformer being mounted in quadrature with respect thereto, receives the maximum induced potential from the stator windings associated therewith, which potential is proportional to the sum of the potentials imposed upon the rotors of the generators and corresponds to the true ground speed of the simulated flight. This potential is amplified and applied to the control phase winding of a second two-phase servo-motor, the other phase winding of which is energized from the alternating current source. This servo-motor is geared by reduction gearing to the shaft of a balancing autotransformer and drives the brush of such transformer to apply a potential of opposite phase to the input side of the associated amplifier circuit, until a value of such potential is attained which balances the input potential to such amplifier from the second rotor winding whereupon the operation of the servo-motor is arrested. The amount of rotation of the balancing transformer shaft is thus a measure of the ground speed and is employed to control the motors of the flight recorder which drive the tractor wheels thereof to progress the flight recorder over the record sheet at a speed commensurate with the ground speed of the simulated flight.

The invention having now been briefly described, reference may now be had to the following detailed description thereof taken in connection with the accompanying drawings, in which:

Fig. 1 discloses circuits embodying the present invention;

Fig. 2 is an isometric view of an interrupter apparatus controlled by the circuit of Fig. 1 for generating impulses of varying duration to control the flight recording of Fig. 5;

Fig. 3 shows the interrupter contacts of the apparatus of Fig. 2;

Fig. 4 is a schematic disclosure of the self-synchronizing steering motor of the flight recorder of Fig. 5 and controllable from the circuit of Fig. 1; and Fig. 5 is an isometric view with portions broken away disclosing the steering and driving mechanism of a flight recorder.

Figure 1:
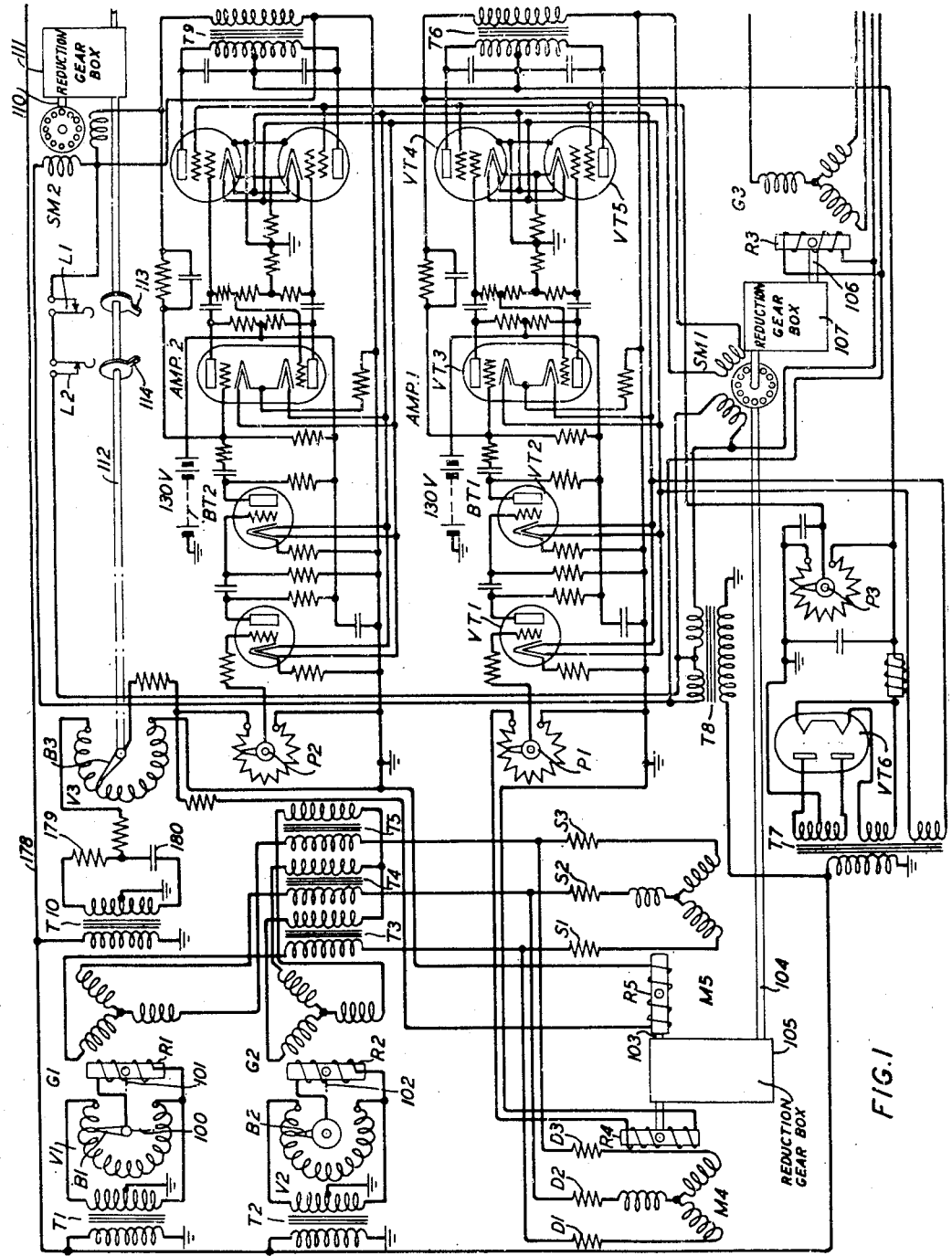

Each of the autotransformers V1, V2 and V3 is provided with a fixed winding and an adjustable brush. The entire winding serves as a primary winding and that portion between one terminal and the point of engagement of the brush with the winding serves as a variable secondary winding. Brush B1 of the transformer V1 is mounted on the shaft 100 which is rotated to assume an angular position commensurate with the instant value of the true air speed of the simulated flight by the true air speed circuit of the trainer and the brush B2 of the transformer V2 is manually rotatable to assume an angular position commensurate with the assumed value of the wind velocity.

The generators G1, G2 and G3, the control transformers M4 and M5, and the synchronous repeater M6 are of the same type, each having a single rotor winding and three stator windings. While the stator windings are disclosed as Y-connected, it is to be understood that they could be Δ-connected. The rotor R1 of generator G1 is mounted on a shaft 101 which is rotated to assume an angular position commensurate with the instant value of the compass bearing of the trainer in its simulated flight and the rotor R2 of generator G2 is mounted on a shaft 102 which is manually rotated to assume an angular position commensurate with the assumed wind direction. The autotransformer V1 and the generator G1 are located in the apparatus cabinet associated with the trainer and the autotransformer V2 and the generator G2 are associated with the instructor's desk and are adjustable by the instructor. The similar windings of the stators of generators G1 and G2 are linked through the windings of the repeating coils T3, T4 and T5 with corresponding windings of the stators of the control transformers M4 and M5 through the serially connected resistances D1, D2 and D3 and resistances S1, S2 and S3. The rotors R5 and R6 of these transformers are mounted on a common shaft 103 but with their windings mounted in quadrature with respect to each other.

Since a control transformer of this type does not follow the movement of the transmitter generator connected thereto, the servo-motor SM1 of the two-phase squirrel cage armature type has its shaft 104 geared to the rotor shaft 103 of the control transformers M4 and M5 through the gear reduction box 105, preferably having a gear reduction of 600 to 1, so that the shaft 103 is rotated through one complete revolution in response to 600 revolutions of the shaft 104 of the servo-motor SM1. The rotor R3 of the generator G3 is mounted on the shaft 106 which is driven through reduction gear box 107 from the shaft 104 of the servo-motor. Preferably this gear ratio is such that the shaft 106 is rotated one complete revolution in response to 50 revolutions of the shaft 104. The stator windings of the generator G3 are connected to the corresponding stator windings of the synchronous repeater M6, the rotor R6 of which is mounted on a shaft 108. This repeater is mounted on the flight recorder disclosed in Fig. 5, the shaft 108 being mounted vertically therein and carrying on its upper end a pinion 109.

A second servo-motor SM2 of the two-phase squirrel cage armature type has its rotor shaft 110 connected through the gear reduction box 111 with the shaft 112. Preferably the gear ratio of the box 111 is such that the shaft 112 is rotated through one complete revolution in response to 600 revolutions of the rotor shaft 110. Connected to the shaft 112 is the brush B3 of the adjustable autotransformer V3 and the operating fingers 113 and 114 of two limit switches L1 and L2. These switches are provided to open the circuit through one phase winding of the servo-motor SM2 when it has rotated the brush B3 to a point adjacent to either end of the winding of transformer V3 to prevent the movement of the brush B3 off the winding. The shaft 112 also carries a pinion 115 for driving the interrupter apparatus of Fig. 2.

The interrupter apparatus of Fig. 2 comprises a frame 116 in the forwardly extending arms 117 and 118 of which is journaled a fluted shaft 119. The shaft 119 is rotatable at any desired slow speed by the synchronous motor M7, which is energized from a commercial source AC of 115 volts 60 cycle alternating current, through the reduction gear box 120 constituting a part of the motor and the spur gears 121 and 122. Slidable along the fluted shaft 119 but driven thereby is a drum 123 having a raised cam surface 124 of a substantially V-shape, the base of which is disposed at the left end of the drum and is substantially as wide as the circumference of the drum and the apex of which is disposed adjacent to the right end of the drum.

The drum is embraced between the arms 125 and 126 which are slidable on the shaft 119 and in holes through which the shaft 119 is freely rotatable. The rear ends of such arms are secured to the rack 127 which is meshed with the pinion 115 secured to shaft 112. Supported in any suitable manner on the frame of the interrupter is a set of contact springs and operating mechanism therefor. This set of springs is best disclosed in Fig. 3 and comprises a movable spring 128 whose contact 129 is normally engaged with contact 130 of spring 131 and whose contact 132 is normally out of engagement with contact 133 of spring 134. For moving spring 128 it is provided with an inturned portion 135 which is engaged by a stud 136 of insulating material secured to the end of operating lever 137. The lever 137 is provided at its forward end with ear 138 between which a cam roller 139 is rotatably mounted and which is operable by the cam surface 124 of the drum 123. The other end of the lever 137 is pivoted between ears 140 of supporting member 141. A backstop member 142 is also provided into which is threaded a first adjusting screw 143 for adjusting the position of spring 134 and into which is threaded a second adjusting screw 144 for adjusting the position of spring 135.

Through the rotation of the pinion 115 by the servo-motor SM2, the rack 127 is moved toward the right or toward the left dependent upon the direction of rotation of the motor and thus slides the drum 123 along the shaft 119. Due to the configuration of the cam surface 124 carried by the drum 123, when the drum is moved to its extreme right position, the rotation of the drum 123 will cause a long closure of the contacts of springs 128 and 134 during each revolution of the drum but when the drum approaches its extreme left position, the rotation of the drum 123 will cause a short closure of the contacts of springs 128 and 134 during each revolution.

Spring 128 is connectable to terminal 173 which in turn is connected in parallel over conductor 172 to the windings of the driving motors of the recorder, the spring 131 is connected to a source of direct current potential and the spring 134 is connected to the commercial source AC of alternating current.

The recorder of Fig. 5 is, as previously stated, of the type fully disclosed in Patent 2,179,663, granted November 14, 1939, to E. A. Link, Jr. In general it comprises a casing triangular in shape having a bottom plate 151. Suitably secured to the underside of the plate 151 is a self-synchronous motor M6, the shaft 108 of which extends upwardly through the plate and is provided at its upper end with a pinion 109. The pinion 109 meshes with three relatively large gears 152, 153 and 154 mounted upon the upper ends of shafts 155, 156 and 157, respectively, which are journaled in the base plate 151. The gear ratio between the pinion 109 and the gears 152, 153 and 154 is 1 to 12. Obviously, the rotation of the motor shaft 108 will result in simultaneous and like motions of the shaft 155, 156 and 157.

Each of the shafts 155 and 156 extends downwardly through the plate 151 and through a bushing such as 158, in the lower end of which is located a ball bearing journal. The lower end of each of these shafts projects below the bushing and has secured thereto a bracket 159 to which is secured a motor 160 of the telechron clock type. The shaft of the motor is journaled in the bracket 159 and carries a pinion (not shown) which meshes with a gear connected to the tractor wheel 161 which is journaled on a stub shaft secured to the bracket 159.

Secured to the motor and insulated therefrom are two brushes (not shown) which are electrically connected to the terminals of the field coil 162 of the motor and which brushes engage with slip rings 163 and 164 insulatedly supported on the bushing 158. By means of the brushes and slip rings, power may be transmitted to the motor while the motor and the tractor wheel 161 driven thereby may be oriented by the rotation of the shaft 155.

The slip rings associated with the propeller motors carried by the two shafts 155 and 156 are connected in parallel to conductors 165 and 166, conductor 165 extending to one of the contacts of switch 167 carried by the cover plate 168 of the recorder casing, the other contact of which is connected by a conductor 169 of the flexible cable 170 to a ground terminal 171, and conductor 166 extending by another conductor 172 of the flexible cable to a terminal 173 which is connected to the movable spring 128 of the interrupter contact set. The terminals of the stator and rotor windings of the repeater M6 are also connected by conductors of the same flexible cable to terminals indicated by the bracket 174 corresponding to terminals of the stator and rotor windings of the generator G3 of Fig. 1.

The shaft 157 also projects downwardly through the plate 151 and terminates in a bifurcation in which a marking wheel 175 is suitably journaled. The marking wheel is adapted to receive ink from an inking roller 176 pivotally mounted on the shaft 157 by the links 177. The recorder is thus supported by the two tractor wheels 161 and the marking wheel 175, the progress of the recorder being determined by the operation of the motors 160 geared to the tractor wheels 161 and the direction in which the recorder proceeds being determined by the orientation of the tractor wheels 161 and the marking wheel 175.

The manner in which the recorder is operated will now be described. It will be asumed that the interrupter drum 123 is at the time positioned with respect to the contact set as shown in Fig. 2 and that the switch 167 on the recorder has been operated to its closed position. As the motor M7 rotates the drum 123, the cam surface 124 on the drum disengages the contact 129 of spring 128 from the contact 130 of spring 131 and engages contact 132 of spring 128 with contact 133 of spring 134, whereby the circuits of motors 160 of the recorder are closed once during each revolution of the drum and, since with the drum positioned as shown, each closure of the circuits of motor 160 will last during approximately one-half of the revolution of the drum, the recorder will, therefore, advance step by step in the direction controlled by the instant orientation of the tractor wheels 161 and marking wheel 175.

It will now be assumed that a change in the direction and velocity of the wind occurs and that the instructor therefore rotates the brush B2 of the autotransformer V2 until a setting is secured indicative of the changed wind velocity and that the instructor rotates the rotor R2 of the generator G2 until a setting is secured indicative of the changed wind direction. The movement of the brush B2 of the autotransformer V2 changes the transformation ratio thereof whereby potential applied from the source of alternating current AC over conductor 178 to the primary winding of transformer T2 is induced into the secondary windings of transformer T2, is modified by the autotransformer V2 and is applied across the winding of rotor R2 of the generator G2. The energization of the winding of rotor R2 causes potential to be induced into the stator windings of the generator G2 thereby causing current to flow through the right windings of transformers T3, T4 and T5. The rotation of the rotor R2 causes the variation of the potentials induced into the stator windings of the generator G2 and a variation of the potentials applied across the right windings of transformers T3, T4 and T5.

It will also be assumed that in the operation of the trainer in response to the operation of its controls by the trainee the brush B1 of the autotransformer V1 is rotated to a degree indicative of a change in the true air speed at which the simulated flight is being conducted and that the rotor R1 of the generator G1 is rotated to a degree indicative of a change in the compass bearing of the simulated flight. The movement of the brush B1 of the autotransformer V1 changes the transformation ratio thereof whereby potential applied from the source of alternating current AC over conductor 178 to the primary winding of transformer T1, is induced into the secondary winding of transformer T1, is modified by the autotransformer V1 and is applied across the winding of rotor R1 of the generator G1. Energization of the winding of rotor R1 causes potentials to be induced into the stator windings of the generator G1 thereby causing current to flow through the left windings of transformers T3, T4 and T5, through resistances D1, D2 and D3 and the stator windings of control transformer M4 and in parallel therewith through resistances S1, S2 and S3 and the stator windings of the control transformer M5. The rotation of the rotor R1 causes the variation of the potentials induced into the stator windings of the generator G1 and a change in the current flowing through the left windings of transformers T3, T4 and T5 and through the stator windings of control transformers M4 and M5.

Through the action of the transformers T3, T4 and T5, the potentials applied to the right windings thereof are induced into the left windings thereof and added to the potentials applied through the left windings thereof from the generator G1 so that the potentials applied across the stator windings of the control transformers M4 and M5 are the summation of the potentials applied across the corresponding stator windings of the generators G1 and G2. The terminating impedance into which the generators work must be very high compared with that of the control transformers for accuracy. Thus in response to the rotation of the rotors R1 and R2 of the generators G1 and G2, and the resulting variation of the stator winding potentials of such generators the potentials in the stator windings of the transformers M4 and M5 are caused to vary to a degree commensurate with the summation of the degree of variation of the stator winding potentials of the generators.

The energization of the stator windings of the control transformer M4 induces potential into the winding of rotor R4 which is applied across the winding of potentiometer P1 and the potential derived therefrom is applied across the input side of the amplifier circuit AMP1. This amplifier circuit may be of the general type disclosed, for example, in Patent No. 1,654,075, granted December 27, 1927, to W. S. Gorton and comprises two voltage amplifier tubes VT1 and VT2 connected in cascade, a dual triode tube VT3 one unit of which serves to invert a portion of the output of the other unit thereof, and two amplifier tubes VT4 and VT5 connected in push-pull relationship between the output circuits of the tube VT3 and the primary windings of output transformer T6. Filament heating current is supplied to the tubes of amplifier AMP1 from the lower secondary winding of power transformer T7, the primary winding of which is connected over conductor 178 to the source of alternating current AC. Plate potential for the amplifier tubes VT4 and VT5 is supplied from the upper secondary winding of transformer T7 through the rectifier tube VT6 and screen grid potential is supplied to the tubes VT4 and VT5 from the upper secondary winding of transformer T7 through the rectifier tube VT6 and the potentiometer P3. The filaments of the rectifier tube VT6 are heated by current supplied through the middle secondary winding of transformer T7. Plate potential for tubes VT1, VT2 and VT3 is supplied from the plate battery BT1.

The potential applied from the winding of rotor R4 to the input side of the amplifier circuit AMP1 is thus amplified and the amplified output potential is applied from the secondary winding of the output transformer T6 across one phase winding of the stator of servo-motor SM1. The other phase winding of this motor is energized from the source of alternating current AC applied thereto over conductor 178 and the windings of tranformer T8. So long as there is an output potential from the amplifier circuit AMP1, both phase windings of the motor SM1 will be energized and the motor will operate rotating the armature shaft 104 in one direction or the other dependent upon the polarity of the potential received from the winding of rotor R5, amplified by the amplifier AMP2, and impressed upon the control phase winding of the motor SM1, with respect to the instant polarity of the potential applied from the transformer T8 to the other phase winding. This polarity difference will in turn be dependent upon whether the summation of the movements of the rotors of the generators G1 and G2 is in one or the other sense. The rotation of the armature shaft 104 results in the rotation of shaft 103 upon which the rotors R4 and R5 of the control transformers M4 and M5 are mounted at a slow speed as determined by the reduction gear box 105. As the rotor R4 is thus turned, the potential induced into its winding from the stator windings of the control transformer M4 is gradually reduced, the output potential from the amplifier circuit AMP1 is gradually reduced and consequently the speed of rotation of the servo-motor SM1 is reduced until the rotor R4 assumes a position in which the potential induced into its winding becomes zero at which time the control phase winding of motor SM1 receives no potential and motor SM1 comes to rest.

The rotation of the shaft 104 of motor SM1 in addition to rotating the rotors of control transformers M4 and M5 as just described, also rotates the shaft 106 of the rotor R3 of the generator G3 through the interposed reduction gear box 107 and, since the winding of rotor R3 is energized by current from the source AC applied thereto through the windings of transformer T8, the rotation of the rotor winding establishes varying potentials in the stator windings of generator G3 and a corresponding potential variation in the stator windings of the synchronous repeater M6 of the flight recorder of Fig. 5. As the winding of the rotor R6 of the repeater M6 is also energized in parallel with the rotor winding of the generator M3, the rotor R6 rotates in synchronism with the rotor R3 and through the pinion 109 mounted on the shaft 108 of rotor R6 and the spur gears 152, 153 and 154 rotate the shafts 155, 156 and 157 to orient the tractor wheels 161 and the marking wheels 175 of the flight recorder. Since it has been assumed that the reduction gear box 107 has a reduction gear ratio of 60 to 1 and the pinion gear 109 and spur gears 152, 153 and 154 of the flight recorder have a gear reduction ratio of 12 to 1, the shafts 155, 156 and 157 are oriented one complete revolution in response to 600 revolutions of the rotor shaft 104 of the motor SM1. The motor SM1 thus serves to change the orientation of the flight recorder in accordance with the change in the bearing of the simulated flight.

At the time the rotor R4 of the control transformer M4 is rotating to a position in which the potential induced into its winding is reduced to zero, the rotor R5 of control transformer M5 being mounted on the common shaft 103 in quadrature to the rotor R4 receives an increasing induced potential from its associated stator windings. This potential is applied across the winding of potentiometer P2 and the potential derived therefrom is applied across the input side of the amplifier circuit AMP2. This amplifier circuit is identical with the amplifier circuit AMP1 and is similarly supplied with filament heating current from the power transformer T7 and with plate and screen grid potentials from the rectifier tube VT6 and the associated potentiometer P3.

The output potential from the amplifier circuit AMP2 is applied through the output transformer T9 to the control phase stator winding of the servo-motor SM2, the other phase winding of which is supplied with potential from the source AC over windings of transformer T8 and over the normally closed contacts of the limit switches L2 and L1. The motor SM2 therefore operates rotating its rotor shaft 110 and through the reduction gear box 111 rotating the shaft 112.

The motor SM2 will rotate in one direction or the other dependent upon the polarity of the potential received by the winding of rotor R5, amplified by the amplifier AMP2 and impressed upon the control phase winding of the motor SM2, with respect to the instant polarity of the potential applied from the transformer T8 to the other phase winding, and this polarity difference will in turn be dependent upon whether the summation of the movement of the brushes B1 and B2 of the autotransformers V1 and V2 is in one or the other sense.

As the shaft 112 rotates it moves the brush B3 of the autotransformer V3, the winding of which is energized by potential applied thereto from the source AC over conductor 178 and the windings of transformer T10. This potential, because of the association of resistance 179 and condenser 180 with the secondary windings of transformer T10, is displaced 180 degrees in phase with respect to the phase of the potential impressed from the winding of rotor R5 upon the input side of the amplifier circuit AMP2 and consequently the potential derived from the autotransformer V3 through the adjustment of its brush B3 by the motor SM2 being also applied to the input side of the amplifier circuit, tends to gradually balance the potential applied from the winding of rotor R5 and to cause the speed of motor SM2 to become gradually reduced until the rotor R5 comes to rest, at which time the potential induced into its winding and applied to the input side of the amplifier circuit AMP2 will be completely balanced by the potential applied through the autotransformer V3. No potential will therefore be effective in the input side of the amplifier circuit and consequently no potential will be impressed from the output transformer T9 upon the control phase stator winding of the motor SM2. Motor SM2 will therefore be brought to rest.

The potential induced into the winding of rotor R5 being a summation of the potentials impressed upon the windings of the rotors R1 and R2 of generators G1 and G2 incident to changes in the true air speed of the simulated flight and in the wind velocity, the amount of rotation of shaft 112 by the motor SM2 under the control of the rotor R5 is a measure of the change in the actual ground speed of the simulated flight.

The rotation of shaft 112 also rotates the pinion 115 carried thereby and the pinion meshing with rack 127 of the interrupter causes the movement of the drum 123 along the shaft 119 in the manner previously described. If it be assumed that the combined effect of the change in the true air speed and the change in the wind velocity has been to rotate the shaft 112 in a direction indicative of an increase in the ground speed of the simulated flight, the pinion 115 will cause the drum 123 to be moved toward the right with respect to the interrupter contact set thereby increasing the length of the closure between springs 128 and 134 during each revolution of the drum 123 and thereby increasing the length of the interval during which the circuits of the propelling motors 160 of the flight recorder are closed during each unit period of time. Thus the flight recorder is advanced by longer steps indicative of an increased ground speed of the simulated flight.

Had the shaft 112 been rotated in the opposite direction indicative of a reduced ground speed then the drum 123 would have been moved toward the left with respect to the interrupter contact set thereby reducing the length of the closure between springs 128 and 134 during each revolution of the drum 123 and thereby reducing the length of the intervals during which the circuits of the propelling motors 160 of the flight recorder are closed during each unit period of time.

It is to be noted that between successive closures of the circuits of the propelling motors 160 of the flight recorder, contacts 128 and 131 of the interrupter contact set are closed thereby connecting the field windings of the motors in series with the source BT3 of direct current. The connection of direct current to the motors locks them against operation so that between propelling impulses the flight recorder is held against accidental displacement.

If the shaft 112 should be driven by the motor SM2 until the brush B3 carried thereby approaches one or the other end of the winding of the autotransformer V3, one or the other of the fingers 113 and 114 carried by the shaft will operate the contacts L1 or L2 of the limit switches to open the circuit of one phase winding of the motor SM2 to arrest further rotation of the motor and to thus prevent the brush B3 from being driven out of engagement with the winding of the autotransformer.

While the generators G1 and G2 and the control transformers M4 and M5 have been illustrated and described as having three-winding stators, it is to be understood that generators and transformers having two-winding stators could be employed.

This application is a continuation of application Serial No. 542,967, filed June 30, 1944 for a Telemetric system.

What is claimed is:

1. In a telemetric system a plurality of transmitters each having a multiwinding stator and a rotor, means for applying potentials to said rotors proportional to the magnitudes of different forces, means for rotationally displacing said rotors proportionally to the directions of said respective forces, two receivers each having a multiwinding stator connected to the stators of said transmitters and a rotor, a motor geared to the rotors of said receivers and a thermionic amplifier circuit interposed between the rotor of one of said receivers and said motor for controlling said motor to bring the rotor of said one receiver into a rotational position corresponding to the vectorial sum of the positions of the rotors of said transmitters and to bring the rotor of said other receiver into a rotational position in which the potential impressed therein is proportional to the vectorial sum of the potentials applied to the rotors of said transmitters.

2. In a telemetric system, a plurality of transmitters each having a multiwinding stator and a rotor, means for applying potentials to said rotors proportional to the magnitudes of different forces, means for rotationally displacing said rotors proportionally to the directions of said respective forces, two receivers each having a multiwinding stator and a rotor, transformers for linking the corresponding stator windings of said transmitters and said receivers together, a motor geared to the rotors of said receivers and a thermionic amplifier circuit interposed between the rotor of one of said receivers and said motor for controlling said motor to bring the rotor of said one receiver into a rotational position corresponding to the vectorial sum of the positions of the rotors of said transmitters and to bring the rotor of said other receiver into a rotational position in which the potential induced therein is proportional to the vectorial sum of the potentials applied to the rotors of said transmitters.

3. In a telemetric system, a plurality of transmitters each having a multiwinding stator and a rotor, means for applying potentials to said rotors proportional to the magnitudes of different forces, means for rotationally displacing said rotors proportionally to the directions of said respective forces, two receivers each having a multiwinding stator connected to the stators of said transmitters and a rotor, a first motor geared to the rotors of said receivers, a thermionic amplifier interposed between the rotor of one of said receivers and said motor for controlling said motor to bring the rotor of said one receiver into a rotational position corresponding to the vectorial sum of the positions of the rotors of said transmitters and to bring the rotor of said other receiver into a rotational position in which the potential induced therein is proportional to the vectorial sum of the potentials applied to the rotors of said transmitters, a second motor, a thermionic amplifier circuit interposed between the rotor of said other receiver and said second motor whereby said motor is driven at a speed proportional to the potential impressed from said rotor upon said amplifier circuit and means controlled by said second motor for applying an opposing potential to the input of said latter amplifier circuit until the potential applied to said amplifier circuit from said rotor becomes balanced whereupon said second motor ceases to operate.

4. In a telemetric system, a plurality of transmitters each having a multiwinding stator and a rotor, means for applying potentials to said rotors proportional to the magnitudes of different forces, means for rotationally displacing said rotors proportionally to the directions of said respective forces, two receivers each having a multiwinding stator connected to the stators of said transmitters and a rotor, a first motor geared to the rotors of said receivers, a thermionic amplifier interposed between the rotor of one of said receivers and said motor for controlling said motor to bring the rotors of said one receiver into a rotational position corresponding to the vectorial sum of the positions of the rotors of said transmitters and to bring the rotor of said other receiver into a rotational position in which the potential induced therein is proportional to the vectorial sum of the potentials applied to the rotors of said transmitters, a second motor, a second thermionic amplifier circuit interposed between the rotor of said other receiver and said second motor whereby said latter motor is driven at a speed proportional to the potential impressed from said rotor upon said second amplifier circuit and a variable autotransformer operable by said second motor for applying an opposing potential to the input of said amplifier circuit until the potential applied to said amplifier circuit from said rotor becomes balanced whereupon said second motor ceases to operate.

WILLIAM H. T. HOLDEN.

REFERENCES CITED

The following references are of record in the file of this patent:

UNITED STATES PATENTS

| Number | Name | Date |
| --- | --- | --- |
| 2,124,684 | Behr | July 26, 1938 |
| 2,153,986 | Mac Laren | Apr. 11, 1939 |
| 2,164,412 | Koster | July 4, 1939 |
| 2,179,663 | Link | Nov. 14, 1939 |
| 2,332,523 | Norden | Oct. 26, 1943 |
| 2,355,685 | Stout | Aug. 15, 1944 |
| 2,359,866 | Lowkrantz | Oct. 10, 1944 |
| 2,366,603 | Dehmel | Jan. 2, 1945 |
| 2,395,477 | Gumley | Feb. 26, 1946 |